United States Patent [19]

Plattner

[11] 4,173,942
[45] Nov. 13, 1979

[54] PIZZA MAKING MACHINE

[75] Inventor: Robert F. Plattner, Spring Lake, Mich.

[73] Assignee: Bastian Blessing Company, Inc., Phoenix, Ariz.

[21] Appl. No.: 876,271

[22] Filed: Feb. 9, 1978

[51] Int. Cl.² ................... B05C 5/00; B05C 13/02
[52] U.S. Cl. ............................... 118/25; 118/56; 118/500
[58] Field of Search ................ 118/25, 13, 56, 500; 74/18.1, 60; 209/332

[56] References Cited

U.S. PATENT DOCUMENTS

| | | | |
|---|---|---|---|
| 3,217,561 | 11/1965 | Allgaier et al. | 74/60 |
| 3,405,681 | 10/1968 | Gugler | 118/25 |
| 3,581,598 | 6/1971 | Allgaier et al. | 209/332 X |

*Primary Examiner*—John P. McIntosh
*Attorney, Agent, or Firm*—Watson D. Harbaugh

[57] ABSTRACT

The automatic production of excellent pizza upon short order is assured with the continuous stirring of pizza sauce of controlled consistency, thick and thin, and mechanically applying and spreading it to a professionally uniform thickness upon sheets of pizza dough that are ready for receiving the filling ingredients and then baking to provide high quality pizza both in short order runs as well as long production runs of professionally handled pizza production.

6 Claims, 4 Drawing Figures

PIZZA MAKING MACHINE

BACKGROUND OF THE INVENTION

The attributes looked for by pizza customers are freshness, the consistency of good taste, quality control of ingredients, baking, and the general excellence of the pizza product including eye appeal.

These are economically attained conventionally and rather consistently by long runs of continuous and professionally well controlled excellent pizza production. However, long production runs of top grade pizza are often confronted with deterioration accompanying storage and shelf life including staleness when consumer demands fluctuate. This, however, encourages the unskilled short order making of pizza which, though fresh, is inferior and becomes a second choice product. If the experienced skill, care and timing that is required conventionally is provided for short run orders, such requires substantial additional time and cost and waste of materials to provide production run quality in single or short run orders of pizza which suffer against competitive pricing.

SUMMARY OF THE INVENTION

The invention is concerned essentially with maintaining the highest quality and variety of pizza products, in short run as well as long run products, and includes prolonged production capability when required upon demand to provide in all of the products not only professional quality but also to reduce greatly thereby the need for storage shelf space that discourages production runs while also reducing the need for professionally skilled help when it may not be available.

For consistency of taste, which is the main consideration for excellent pizza, the preparation of pizza requires a great deal of skill, care and timing from the proper and continuous mixing of sauce employed to its proper application, and to baking it at high temperatures which causes some liquidity of sauces. Of these steps, the application and the spreading of the sauce are the most critical. Manual spatulation is inadequate and time consuming and requires clean up between uses of different sauces.

In the present invention, the mixing, applying and spreading of the sauce may be controlled to provide consistency of the best results by selectively timing the application of the sauce and spreading it automatically under gravitation effects for uniformity of saleable results involving many variations which can be described in connection with combinations of three conditions related to sauce consistency in different selectable kinds such as thin sauce, thick sauce, three different amounts for each pizza crust relating to size and number of layers with each automatically spread for uniformity of each of the conditions for nine combinations, all of which can be essentially controlled by an accurate, adjustable, self-timing switch including, in some instances, changes of speed.

Of the steps involved in making top quality pizza, the most important and critical ones are those performed by the invention; namely selectively mixing, applying and spreading sauces automatically for uniformity of high quality product; and this is not only for single or short order runs, but also, if need be, for improved long production runs and involving many variations merely by the preselective touch of one of several switches.

Although plural work stations can be provided in a group, only one is illustrated in detail as representative of other stations if more than one is desired for the same or selectively different sauces.

IN THE DRAWINGS

DESCRIPTION OF THE INVENTION

Figure 1:
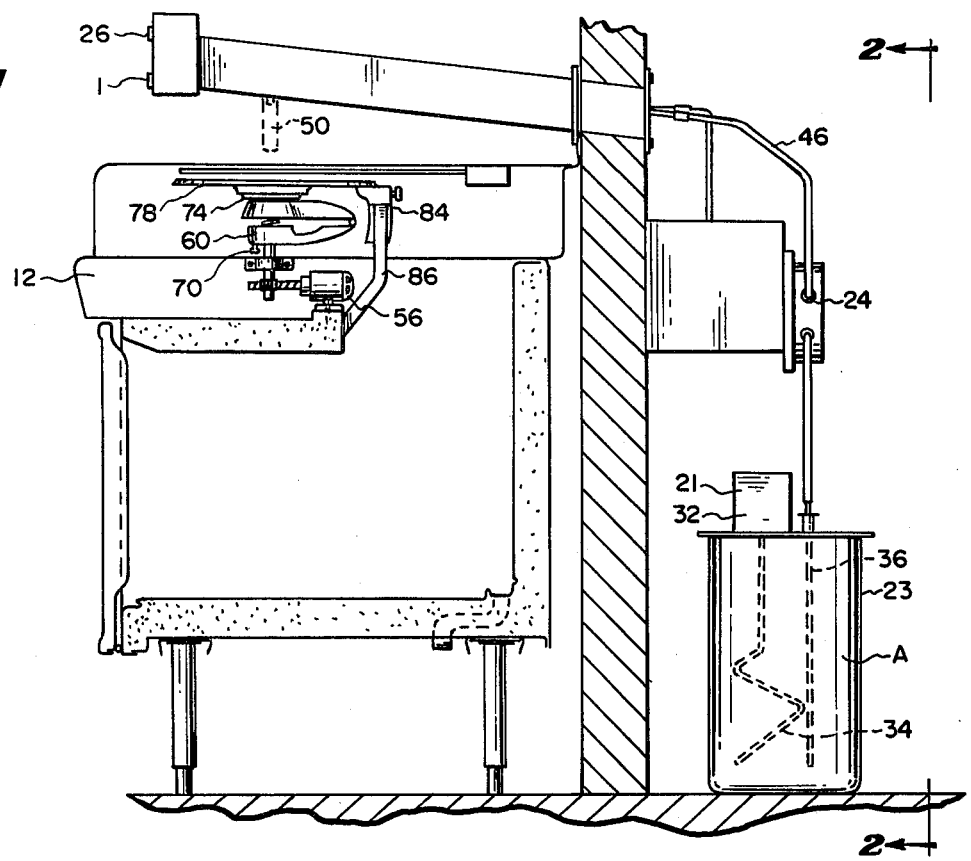
FIG. 1 is a rear elevation operator's view of an installation of the invention with two pizza sauces available.
Figure 2:
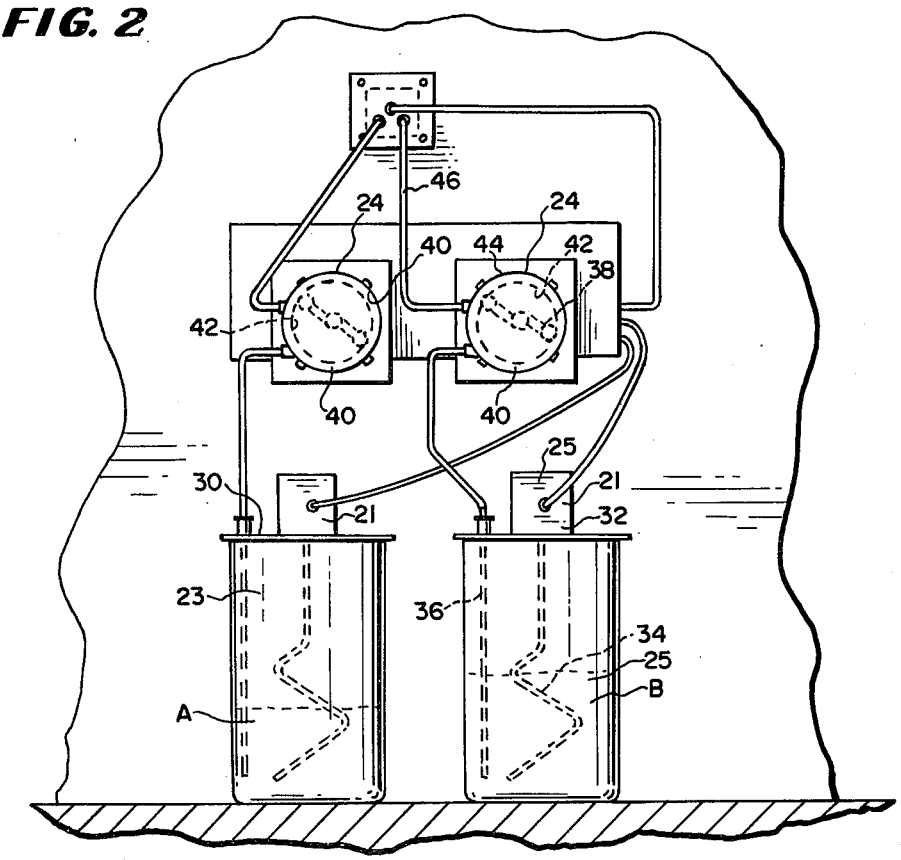
FIG. 2 is a rear view of the kitchen sink station having a plurality of pizza sauce supplies.

For consistency in attaining in short order pizza products the taste, quality and general excellence that is attained by skilled continuous production runs, a great deal of care and timing is required including the continuous mixing, dispensing and spreading of a well prepared sauce or sauces to receive the layers of the proper ingredients for baking.

Considering first the mixing and dispensing of the sauces and referring to the drawings in further detail, a pizza work table 10 is illustrated having a top 12 supporting an adjustable, preferably circular, plate 14 rimmed at 16 to receive and center a circular pizza pan of any one of several predetermined diameters against which a vertically disposed laterally movable cutter 18 cooperates for trimming a rolled layer of pizza dough placed thereon, if not already cut to size. The cutting of the rolled dough is preferably done upon rotary movement of the plate 14, which is quickly accomplished by hand in making each pizza.

Selective dispensing of one or more of a number of different pizza sauces is illustrated with multiple containers 20 as representative of numbers of sauces which can be handled.

Dispensing of Sauces:

By way of example, two different sauces are considered. Each sauce is preferably stored in a stainless steel container 23 located in a cool or warm place for fluidity control, where the sauce can be continually agitated by beaters 34 driven by the motors 21 and readily replenished or replaced when desired. Thicker sauces preferably may be warm to match thinner sauces to minimize apparatus adjustments of the same or different consistencies.

Each container 23 has a lid 30 that preferably carries a continuous running motor 21 and gearing 32 that rotates an agitator 34 of suitable design for consistency involved and has a dip tube 36 for educting sauce 25 by means of peristaltic pumps 24 which comprise a motor time-controlled to rotate diametrically opposite parallel rollers 38 running against a soft resilient tube 40, preferably translucent, that is wound in a circle 42 of one turn that rests against a circular track 44. The rollers 38 progressively collapse the loop of the tube and positively displace and force sauce to move through it in an amount determined by the timed number of pump revolutions. With this arrangement, the tube remains primed at all times without the sauce deteriorating in the tubes and dispenses exact amounts regardless of consistency. The sauce as thus stirred in a stainless steel container and dispensed without open air contact is maintained in a predetermined potable condition ready for immediate use and does not contact anything that would change the character or taste.

Two sources of sauce are illustrated. There can be more with the discharge conduits 46 leading through an overhanging arm to end in a normally terminally closed resilient outlet nipple 50 that is easily removable for cleaning. The arm carries a control box 26 which supports, within easy reach of the operator, adjustable electric timer switches for the motors driving the peristaltic pumps 24.

The peristaltic pumps 24 are adjustably timed to operate as meters to assure accurate amounts of sauce each revolution and as operated by selector circuit switches 26 are adjustable to determine the number of pump revolutions desired for the respective sauces each application. Each switch operates instantaneously upon finger contact, cannot be held to over-run an adjustably set period of time, and must be released before a second timed-period can be initiated.

When a mixture of sauces is desired for the pizza, two appropriate switches are pressed simultaneously. The respective pumps are preferably timed by the two switches to run simultaneously but only for half the period of time to discharge two sauces through a single nozzle as one layer. Accordingly, any one of a number of selectable sauce switches may be pressed, and the exact amount of sauce is dispensed by the adjusted timing of pump actuation and its speed ready to be evenly spread on the pizza dough.

Figure 3:
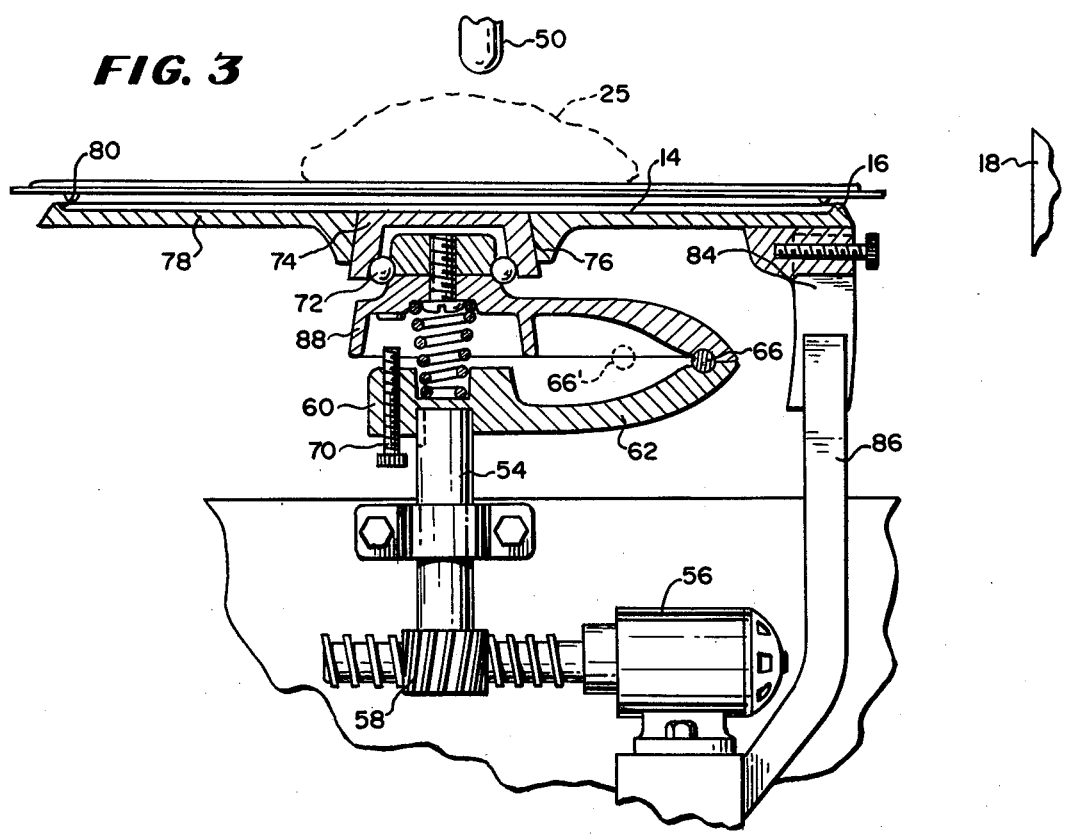
FIG. 3 is a side elevational view of the elements at a single station partly in section.
Figure 4:
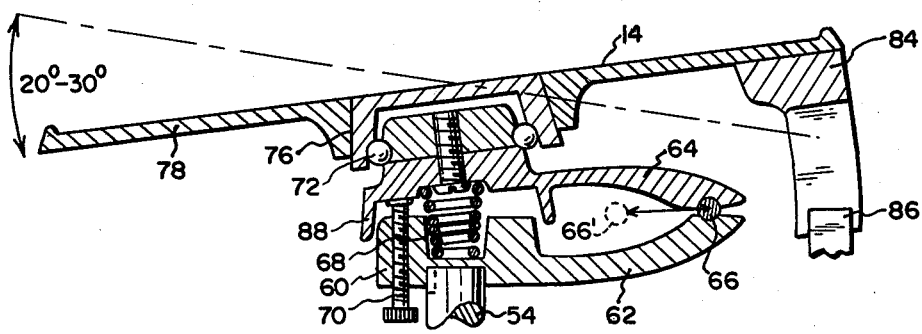
FIG. 4 is a vertical semi-sectional view of one of the sauce applying stations illustrating alternate and progressive orientations of the wobble plate action for evenly spreading a sauce.

Spreading of Sauces:

Referring now to FIG. 3, the dispensing and spreading of the sauces are critical steps for ultimate excellent results. Although AC current can be used to vibrate a horizontal table upon which sauce is dispensed, it is not satisfactory. By the time the edge of the spreading sauce reaches the edge of the dough, it is still too thin marginally when the vibration has to be stopped, and the sauce at the center is still too thick. This disparity can provide an objectionable unevenness in baking and in the end product.

Also, although the sauce can be spread by hand like a batter, or with an oscillated rake board or spatula, the irregularities occurring thereby are objectionable, and different thicknesses are still a problem. Other conventional means of spreading cannot handle different thicknesses of sauces without substantial changes being made operationally each time a different sauce is ordered, and, with a conventional sauce cascade system, either the dough blank has to be rectangular, or the sauce discharged with an uneven thickness radially and with a possible radial overlap thickess or thinness.

Referring now to the spreading of the sauce or mixture of sauces when centrally discharged to the pizza layer of dough 17, the sauce discharged has been forced to flow through the conduits 36 and 46 with liquidity under the ingredient compressions of the rollers 38 and is preferably uniform in consistency and amount, its flow laterally by gravity upon an inclined surface. The outlet of the nipples 50 discharge the sauce above the center of a novel wobble plate spreader which can be readily removed from time to time for cleaning.

For explanation and consideration of only one sauce dispensed at one time, the discharge may comprise a mass that has approximately the consistency of catsup that flows quite slowly at an angle of 10° to 30° from the horizontal, it being appreciated also that the consistency of the sauce can be another time variable within which to spread under controlled conditions.

In the present invention a progressive wobble action of a non-rotating plate provides the best results with the baking pan disposed horizontally when it centrally receives the sauce on the dough sheet for gravity flow spreading.

A non-rotatable plate, preferably of aluminum accomodates the wobble action whose tilt and speed are readily adjustable for different consistencies of sauce and operates to spread sauce uniformly throughout without spilling.

More particularly, below the sauce discharge hose 50 is journeled a vertical shaft 54 driven by an adjustable speed motor 56 through an illustrated low speed transmission of worm and gear 58 developing a shaft rotation of $\frac{1}{2}$ rotation per one or two seconds. On its upper end the shaft carries a fitting 60 having a radial arm 62 and an overlapping movable arm. The arms are pivoted at their outer ends as at 66 so that the elements 62 and 64 may reciprocate at free inner ends with respect to each other located at approximately the axis of the shaft. The closer the pivot 66 is to the center of rotation the greater the tilt, and this could be adjustable to 66'. Preferably a resilient means such as a hydraulic piston (not illustrated) or a compression spring 68, or both, may be disposed between the arms to mormally hold them parallel and apart under their own weight and resting conditions yet yield in relation to the weight of sauce centrally to the turntable.

The pivoted arm 64 carries a ball bearing assembly 72 which journals an inverted cup shaped turntable element 74 that tapers upwardly at 76 to receive in snug relation thereon a plate 78 having a rim 80 which releasably supports a flanged pizza pan. The plate 78 is provided with a vertical stop 84 that engages a stop 86 which permits relative vertical movement but prevents rotation of the plate 78.

Thus in the present invention all layers and thicknesses of pizza sauces and filling can be run under conditions which are standardized for constantly repeated high quality, correctly spread by the wobble-plate action upon the dough, and are ready to receive the topping layer ingredients before baking.

A finger adjustment screw 70 of the arm 62 engageable by the pivoted member can be set to limit the pivot tilt of the upper member. By adjusting the distance of movement between the two elements at the axis of rotation of the shaft 54, a deep or shallow acting wobble plate action is provided which diminishes or stops when the sauce is finally spread.

The resilient means 68 is shielded from contamination by an inverted cup element 88 and preferably holds the two arms parallel to support the weight of the baking pan 82 empty with a dough sheet on it. It is counterbalanced, as desired, with respect to the pivotal axis 66 tangent to its radius of spacing to yield downwardly when the upper arm centrally carries the additional weight of the sauce before it is spread.

In operation, when pizza sauce is deposited at the center of the pan 82 its weight is greater at the motor axis inwardly of the pivot axis 66 and the "wobble plate" tilt is established simultaneously with the start of the motor 56.

The motor starts and urges the turntable against the stop 84. When the measured flow of sauce approaches completion, the centrally concentrated weight of the sauce the resilient means 68 and the turntable is tilted to its "wobble-plate" position for a controlled run. Thereafter, depending in part on the adjustment of the counter weight 84, the pan returns to level position automatically when the desired weight distribution of sauce is reached on opposite sides of the pivot pin 66, as related to the resilient means 68. Then the motor is preferably stopped, the pan is lifted off to receive the topping filler ingredients, and, if any further layers of sauce and filler are desired, the pan is placed on each one of a series of successive turntables adjusted accordingly, or back on the same with the predetermined weight adjustment change with another dough layer applied and trimmed for multi-layer pizza.

Pressing a sauce switch a second time for the same pizza would double the amount of sauce dispensed. This is generally a great deal to spread and thereby operates to discourage wasteful use of the sauce, but it does enable two full flavors of sauce to be dispensed if desired by a customer willing to pay for it upon special short orders. If a mixture of sauces is desired equivalent to only one thickness the pressing of a joint switch control times the respective pumps 40 for simultaneous operation for one-half the time of their regular operation.

The routine of the control system preferably begins after placing and trimming a rolled dough flat on the turntable which, when present, arms the electrical controls for that station. A sauce button activates the dispensing of the sauce and the rotation of the supporting plate to its stop held position. When the sauce tilts the plate it commences the wobble action and all other controls are blocked out until the wobble plate tilts back to horizontal at which time the wobble plate motor can be stopped, if desired, or another pizza started. The pizza pan is lifted off ready for filling and baking, and, the apparatus is ready for a repeat cycle.

Preferably only one charge of sauce is permitted during one cycle, and the wobble plate action is sustained until the spread of the sauce reaches a spread area that is self determined by a balance scale-like effect that can be preset or changed as desired but provides unvarying quality for successive pizzas produced.

What is claimed is:
1. In a pizza making machine,
a vertical shaft rotatable at a slow speed,
a substantially flat pizza supporting plate disposed substantially coaxially at its base with said vertical shaft,
a fitting between said shaft and plate carried on the upper end of the shaft comprising a radially extending lower arm member secured at one end to the shaft for rotation thereby and carrying a horizontally disposed off center pivot means located within a vertical projection of the supporting plate,
a plate supporting arm pivotally supported for limited vertical movement on said pivot means and carrying a bearing assembly disposed substantially coaxial with said vertical shaft for a variable tilting movement progressing rotatively with respect to the lower member,
resilient means normally holding said bearing with its axis disposed vertically and yielding downwardly under additional weight of sauce deposited centrally on the plate to incline said axis from the vertical,
peristaltic pump means discharging a charge of pizza sauce on the plate at the center thereof, and
means for supporting said plate against rotation to provide a wobble action for spreading said pizza sauce thereon from the center towards the peripheral edge.

2. A pizza making machine comprising,
a vertical shaft driven at slow speed,
a fitting carried on the upper end of said shaft having a radial arm,
a vertically movable arm pivotally supported on said radial arm a spaced distance from said shaft and carrying a bearing member rotatable substantially coaxially with said vertical shaft for horizontal tilting movement of said bearing member to provide a vertical wobble action thereof about the bearing axis,
non-rotatable bearing means journalled on and movable with said bearing member for carrying a pizza plate normally in a horizontal position when empty,
means for discharging a predetermined amount of pizza sauce on said plate coaxially with said bearing means to tilt said bearing member and pizza plate from the horizontal to wobble the bearing member,
means for supporting said pizza plate against rotation to follow the wobble of the non-rotating bearing portion as disposed on the tilted axis to spread the sauce thereon under its own weight, and
resilient means interengaging the pivotal arm and plate for returning and normally supporting said plate in its horizontal position without wobble.

3. In a pizza making machine having a spindle means rotatable at a slow speed on a predetermined vertical axis,
bearing means normally carried coaxially by said spindle and resilient means interconntecting said spindle and bearing means for tilting the bearing means and its axis from the vertical when axially loaded centrally with pizza sauce,
plate means supported on said bearing means for wobble action of the plate means by said tilted bearing for spreading and supporting pizza sauce loaded on it concentrically with said bearing member, and
means for holding the plate means against rotation.

4. In a pizza making machine,
a vertical shaft rotated at slow rate on a predetermined axis,
a first arm means supported on the shaft and carrying a horizontally disposed pivot means spaced radially from said axis,
a second arm means pivotally supported on the first arm by the pivot means and carrying at its free end a bearing means whose axis is substantially that of said vertical shaft,
a turntable means receiving a pizza pan and being rotatably mounted coaxially on said bearing means,
a container for storing pizza sauce to maintain its mixture liquidity,
a pump means for depositing a selected amount of pizza sauce centrally on said pizza pan,
resilient means interengaging said arm means yielding to dispose said axes at an acute angle with respect to each other,
means for holding said turntable means and said bearing means against rotation to said acute angle to provide said turntable with a vertically directed wobble action to spread the pizza sauce centered on the pan under the influence of gravity, and said resilient means returning said pan to horizontal when the thickness of the sauce is substantially uniform on the pan.

5. The combination defined in claim 4 in which said resilient means overcomes the central weight of the turntable with the pizza on it when the radial effective weight of the sauce is distributed a predetermined degree in a radial direction beyond said pivot means between the arms.

6. The combination defined in claim 4 including an adjustable element between said first and second arm means for varying the angle between said two axes.

* * * * *